United States Patent [19]
Molitor

[11] Patent Number: 4,725,058
[45] Date of Patent: Feb. 16, 1988

[54] SOFTBALL

[75] Inventor: Robert P. Molitor, Niles, Mich.

[73] Assignee: Spalding & Evenflo Companies, Inc., Tampa, Fla.

[21] Appl. No.: 876,505

[22] Filed: Jun. 20, 1986

[51] Int. Cl.⁴ .............................................. B29C 27/08
[52] U.S. Cl. .............................. 273/60 B; 273/DIG. 5
[58] Field of Search ................. 273/60 B, 60 R, 60 A, 273/58 B, 58 A, DIG. 5

[56] References Cited

U.S. PATENT DOCUMENTS

| | | | |
|---|---|---|---|
| 4,211,407 | 7/1980 | Tomar | 273/60 B |
| 4,498,667 | 2/1985 | Tomar | 273/60 B |
| 4,610,071 | 9/1986 | Miller | 273/60 B X |
| 4,653,752 | 3/1987 | Miller | 273/60 B |

*Primary Examiner*—George J. Marlo
*Attorney, Agent, or Firm*—Donald R. Bahr; John E. Benoit

[57] ABSTRACT

A softball having a core and a cover wherein the ball has a circumference of approximately 12 inches, a weight of 175 to 178 grams, a coefficient of restitution of approximately 0.478 and a compression from about 0.010 to 0.014 inches, wherein said core has a density from about 15.5 to 16.5 pounds per cubic foot, and a hardness from about 72 to 78 on the shore A scale, said core being formed from a cellular polymeric material. The core is surrounded by a cover having a specific gravity of about 1.2, a thickness from about 0.035 inches to 0.060 inches and a hardness from about 78 to 90 on the Shore A scale. The cover is formed from a vinyl resin, a phthalate compound, stabilizers and a titanium dioxide dispersion.

7 Claims, 3 Drawing Figures

U.S. Patent    Feb. 16, 1988    4,725,058
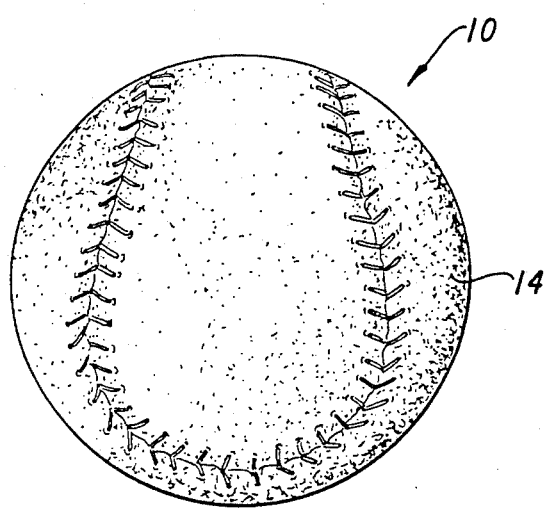
FIG. 1
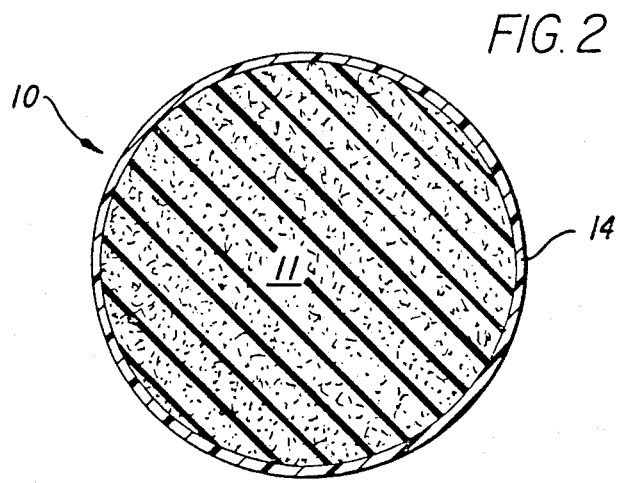
FIG. 2
FIG. 3
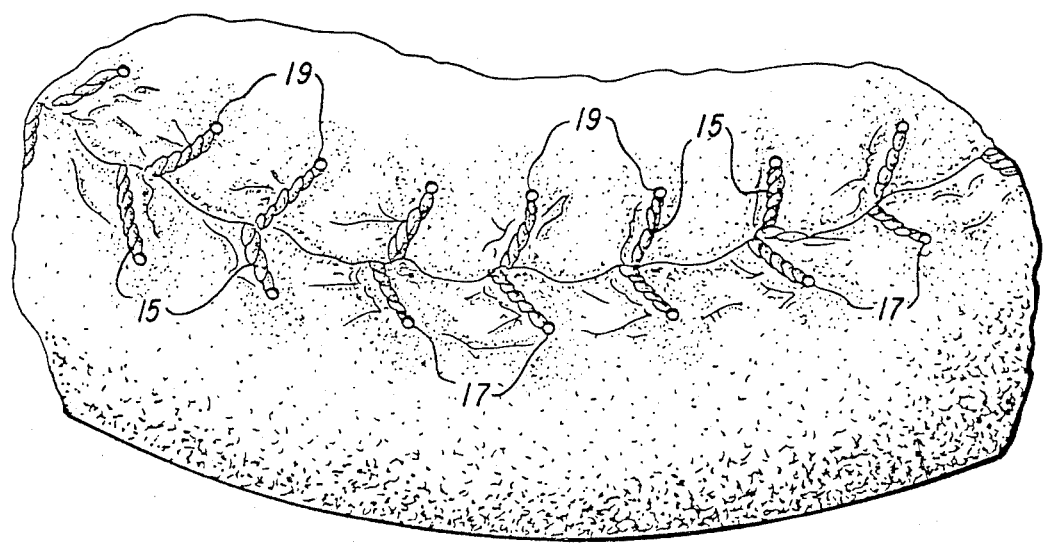

SOFTBALL

BACKGROUND OF THE INVENTION

The present invention relates specifically to softballs that are associated with the game of softball.

The softball of the instant invention has a circumference of approximately 12 inches (30.5 cm), a weight of 177 to 198 grams and a coefficient of restitution of 0.487. The majority of the prior art softballs are covered with a leather cover that is formed from two pieces that are sewn together by hand with herringbone stitching. The stitching tends to form ridges which affect the aerodynamics of the ball and facilitate throwing of pitches which break, curve or slide under their trajectory.

U.S. Pat. No. 4,498,687 to Tomar describes a process for forming rubber or vinyl coated baseballs or softballs in which thermoplastic rubber or plasticized vinyl resin is injected into a mold cavity.

U.S. Pat. No. 4,462,589 to Morgan discloses a safety ball formed with a soft closed-cell plastic foam core. The ball has a type A durometer of less than 60 and preferably in the range of about 25 to 45.

U.S. Pat. No. 3,976,295 to Heald discloses a ball formed with a spherical core of polyurethane foam covered with a thin winding of cotton yarn and with a hand stitched outer cover.

U.S. Pat. No. 4,529,200 to Miller et al describes a game ball for use as a conventional baseball or softball having a conventional core of cork and a plastic shell covering the core in lieu of conventional windings.

U.S. Pat. No. 4,572,507 to Hubbert et al discloses a game ball in which the core consists of a thermoplastic resin center and a winding which is heat fused thereto. The ball is covered with a two-piece stitched cover.

BRIEF DESCRIPTION OF THE INVENTION

The present invention covers a durable softball having a circumference of approximately 12 inches, a weight of 175 to 198 grams, a coefficient of restitution of about 0.478 and a compression of 0.010 to 0.014 inches. The core is a cellular polymeric material such as a polyurethane resin having a density of 15.5 to 16.5 pounds per cubic foot and a hardness of 72 to 78 on the shore A scale. The cover is made up of a vinyl resin, a phthalate compound, stabilizers and titanium dioxide dispersion. The cover has a specific gravity of about 1.2, a thickness of about 0.045 to 0.075 inches and a hardness of 72 to 90 on the shore A scale.

BRIEF DESCRIPTION OF THE DRAWINGS

The following drawings are for the purpose of illustration and are in no way deemed to limit the scope of the present invention.

FIG. 1 is a front view of the ball constructed in accordance with the present invention;

FIG. 2 is a cross-sectional view of the ball constructed in accordance with the present invention; and FIG. 3 is a fragmentary view of a portion of the cover showing the simulated raised welting.

DETAILED DESCRIPTION OF THE DETAILED EMBODIMENT

The balls of the present invention have the following properties:

Circumference: approximately 12 inches, (30.5 cm)
Weight: 177 to 198 grams
Coefficient of Restitution: 0.478

The product thus falls within the American Softball Association specifications. In addition, the product is durable and survives 200 blows on drop testing which is superior as compared with the conventional leather covered ball.

The center portion of the core used in construction of the balls of the present invention comprise a cellular polymeric material such as a polyurethane. The polyurethane when used is made up of an isocyanate and a polyol. A pigment may be added if desired. The pigment, if present, should be one that is compatible with the other ingredients. Preferably, the core is made up from a mixture containing the following ingredients: isocyanate, such as a diphenyl methylene diisocyanate (MDI) with 33% NCO manufactured by BASF Corporation under the name BASF WUC 3125T, a polyol such as a polyether polyol with N,N-[Bispoly(propylene oxide)]ethylene diamine chain extender with OH number=219 manufactured by BASF Corporation under the name BASF WUC 13340-4-46A, and a pigment such as a 30% dispersion of carbon black with an OH number=219 polymer polyol manufactured by Plasticolor, Inc. under the name BASF WUC black paste T-21070.

The core size is adjusted to compensate for the thickness of the chosen cover.

The density of the core can be from about 15.5 pounds per cubic foot to 16.5 pounds per cubic foot. The preferred range for the density of the core is from 15.75 pounds per cubic foot to about 16.25 pounds per cubic foot, with the preferred density being 16 pounds per cubic foot.

In order to get optimum performance, the hardness of the core is of critical importance. In order to produce a ball suitable for professional play, the hardness of the core can be from about 72 to 78 on the Shore A scale. A more specific range for the hardness is about 74 to 76 on the Shore A hardness scale with the most preferred hardness being 75 on the Shore A hardness scale.

The density of the core and the cell size are naturally interrelated with the cellular polymeric material having a proper cell size to provide the desired density so as to give the ball its proper resiliency and compression.

If a relatively thick vinyl cover is used, the density of the core must be adjusted to meet the weight specification, and the durability and coefficient, (impact distortion, etc.) of the core would be seriously degraded. Durability is particularly important in that when a softball is hit with a bat, there is a tendency to crush the interior of the core; hence, after repeated striking with the bat, the core loses shape and loses its coefficient of restitution.

The core of the present invention is covered with a vinyl resin. The cover thickness can vary from about 0.035 to about 0.060 inches. A more preferred cover thickness range is from 0.045 to 0.055 inches with an especially preferred cover thickness being 0.05 inches.

The cover hardness is selected in order to achieve the proper durability. The Shore A hardness of the cover can be from 70 to 90. The more preferred range is about 75 to 85 with a hardness of about 80 being especially preferred. It should be emphasized that a leather-like vinyl compound is not very resilient and the thicker the cover on the ball, the more it detracts from the coefficient of the resulting ball.

The above described cover hardness and core hardness cooperate to provide a finished ball having a compression between 0.010 and 0.014 inches and preferably about 0.012.

The compression is measured in apparatus having an indentation in which the ball is placed. The ball is secured in place by a mount opposite the indentation. Once the ball is secured in place, compensation is made for the securing force and a gauge in associated measuring apparatus is set at zero. A ten pound weight is then placed on the mount so as to bear on the ball between the mount and the indentation and an immediate measurement is taken and recorded. The test is conducted six times, two each at the poles, the sides, and the equator. The results are averaged to obtain the final compression reading.

The cover is made up of a vinyl resin composition as is defined hereinbelow.

In some instances, an adhesive may be applied to the core to assist the bonding of the cover to the core.

In order for a ball to be suitable for official play, it must have playing characteristics that are similar to the original softballs. An important physical characteristic of the original softball is the radius of gyration. The radius of gyration is determined by various densities straight up, which are set up in the original prescribed wound construction. The ball of the present invention closely matches the radius of gyration of an approved leather-covered ball. The radius of gyration of an official softball as manufactured in accordance with the original specification should be from about 1.24 inches to 1.33 inches. The radius of gyration of a ball of this invention is about 1.32 inches with a preferred radius being from about 1.28 inches to 1.32 inches with a preferred range from about 1.30 inches to 1.33 inches with a radius of gyration of 1.31 inches to 1.32 inches being especially preferred.

The ball of the present invention can be manufactured in a much more consistent manner and costs consistently less when compared to the prior structures.

The ball of the present invention literally simulates the stitched leather ball in surface contour including the raised welting which results from the stitching, making the dynamic properties of the ball substantially identical to that of a leather ball.

DETAILED DESCRIPTION OF THE DRAWINGS

FIG. 1 depicts the completed ball 10 having a cover 14 surrounding a polyurethane core.

Referring now to FIG. 2, which is a cross-sectional view of the ball 10 of FIG. 1, ball 10 comprises a polyurethane core 11 provided with a plurality of cells. Surrounding the core 11 is a cover 14.

Referring now to FIG. 3 an enlarged partial view shows the simulated stitching 15 and the stitch holes 17 and 19 which are molded as part of the cover.

The invention is illustrated by the following specific nonlimiting examples.

EXAMPLE 1

In the construction of a softball in accordance with the present invention, 63.5 grams of BASF isocyanate WUC 3125T was dry mixed with 97.5 grams of polyol and 0.8 grams of BASF WUC Black Paste T-21070. The resulting mixture was utilized in forming a core center. All of the ingredients were mixed and poured into a preheated mold.

After forming and cross linking has occurred, the mold was cooled and the core center was removed.

In the preparation of the cover, 100 grams of a vinyl resin such as a homopolymer polyvinyl chloride dispersion resin manufactured by Occidental Petroleum under the name (Tenneco 1755) was mixed with 60 grams of diisononyl phthalate, 6.5 grams of an epoxidized soybean oil stabilizer manufactured by Viking Chemical under the name Vicoflex 4050 stabilizer and 2 grams of a barium-cadmium-zinc octoate liquid stabilizer manufactured by the Argus Division of Witco under the name 797B stabilizer. A total of 1.5 grams of titanium (a 60% dispersion in DINP) was added to the mixture. All of the ingredients were mixed in a blender at ambient temperature until a homogeneous mixture was formed. The material was then poured into a preheated hemispherical mold such as a mold as is disclosed in copending application Ser. No. 876,506 filed concurrently herewith in the name of the same inventor.

A sufficient quantity of the premixed plastesol is poured into both halves of the preheated hemispherical mold in order to fill the mold. The plastisol is allowed to remain in the mold for a sufficient period of time for the plastisol to gel on the inner surface of the mold to reach the desired cover thickness. The excess plastisol is then removed from the mold. The preformed core is then placed in a mold half and the mold is closed.

Heat is applied to the mold in order to fuse the plastisol and bond it to the core. The mold is then cooled and the resulting product is removed therefrom.

For purposes of gelling the plastisol in the mold as described, the mold is preheated to a temperature of 200° to 220° F.

Once the mold is closed, the plastisol is fused and bonded to the core at a temperature of about 320° to 350° F. After fusion, the mold is then cooled to about 180° F. so that the product may be removed without distortion.

It is to be understood that the above description and drawings are illustrative only and the invention is to be limited only by the scope of the following claims.

What is claimed is:

1. A softball having a substantially solid core and cover wherein the ball has a circumference of substantially 12 inches, a weight of 175 to 198 grams, a coefficient of restitution of substantially 0.478 and a compression from 0.010 to 0.014 inches wherein said core has a density from 15.5 to 16.5 pounds per cubic foot, a hardness from 72 to 78 on the Shore A scale, said core being formed from a cellular polymeric material, wherein said cover has a specific gravity of substantially 1.2, and a thickness from 0.035 inches to 0.060 inches, and a Shore A hardness from 70 to 90, said cover being formed from a vinyl resin, a phthalate compound, stabilizers and a titanium dioxide dispersion.

2. The softball of claim 1 wherein the compression of said ball is substantially 0.012 inches, the core hardness is from 74 to 76, the core density is from 15.75 to 16.25 pounds per cubic foot, the cover thickness is from 0.045 to 0.055 inches, and the cover Shore A hardness is from 75 to 85.

3. The softball according to claim 2 wherein the cover has the following composition:
   homopolymer polyvinylchloride disposition: 100.0 parts
   diisononyl phthalate: 60.0 parts
   Epoxidized Soybean Oil Stabilizer: 6.5 parts
   Barium-Cadmium-Zinc Octoate Liquid Stabilizer: 2.0 parts
   titanium dioxide (60% dispersion in DINP): 1.5 parts and the core has the following composition:
- diphenyl methylene diisocyanate (MDI) with 33% NCO: 63.5 g
- polyether polyol with N,N-[bispoly(propylene oxide)]ethylene diamine chain extender with OH number=219: 97.5 g
- 30% dispersion of carbon black with an OH number=219 polyether polyol: 0.8 g.

4. The softball of claim 1 wherein the compression of said ball is substantially 0.012 inches, the core density is substantially 16.0 pounds per cubic foot, the core Shore A hardness is substantially 75, cover thickness is substantially 0.050 inches, and the cover Shore A hardness is substantially 80.

5. The softball according to claim 3 wherein the cover has the following composition:
- homopolymer polyvinylchloride disposition: 100.0 parts
- diisononyl phthalate: 60.0 parts
- epoxidized soybean oil stabilizer: 6.5 parts
- barium-cadmium-zinc octoate liquid stabilizer: 2.0 parts
- titanium dioxide (60% dispersion in DINP): 1.5 parts and the core has the following composition:
- diphenyl methylene diisocyanate (MDI) with 33% NCO: 63.5 g
- polyether polyol with N,N-[bispoly(propylene oxide)]ethylene diamine chain extender with OH number=219: 97.5 g
- 30% dispersion of carbon black with an OH number=219 polyether polyol: 0.8 g.

6. The softball according to claim 1 wherein said cellular polymeric material is a polyurethane.

7. The softball according to claim 1 wherein the cover has the following composition:
- homopolymer polyvinylchloride disposition: 100.0 parts
- diisononyl phthalate: 60.0 parts
- epoxidized soybean oil stabilizer: 6.5 parts
- barium-cadmium-zinc octoate liquid stabilizer: 2.0 parts
- titanium dioxide (60% dispersion in DINP): 1.5 parts and the core has the following composition:
- diphenyl methylene diisocyanate (MDI) with 33% NCO: 63.5 g
- polyether polyol with N,N-[bispoly(propylene oxide)]ethylene diamine chain extender with OH number=219:97.5 g
- 30% dispersion of carbon black with an OH number=219 polyether polyol: 0.8 g.

* * * * *